United States Patent Office 3,770,668
Patented Nov. 6, 1973

3,770,668
STYRENE POLYMER FOAM AND THE
PREPARATION THEREOF
John M. Corbett, Marlin G. Bussey, and Graydon Wayne
Killingbeck, Midland, Mich., assignors to The Dow
Chemical Company, Midland, Mich.
No Drawing. Filed Oct. 29, 1970, Ser. No. 85,258
Int. Cl. C08f 33/02, 45/30, 47/10
U.S. Cl. 260—2.5 E
9 Claims

ABSTRACT OF THE DISCLOSURE

Stable, low density, small cell size styrene polymer foam is extruded in large sections employing a carefully selected blowing agent and an intimate dispersion of the blowing agent with the styrene polymer while in heat plastified form.

---

Extruded styrene polymer foams, such as polystyrene foam, are highly desirable for many applications, including insulation, flotation, decorative purposes and the like. Generally, polystyrene foams for many applications are desired to have a relatively small cell size which enhances insulating properties as well as providing a smooth surface when the material is cut, plus a relatively low bulk density and exhibits dimensional stability when exposed to air. In general, the preparation of extruded polystyrene foam, low density materials, such as those having densities below about 1.8 pounds per cubic foot, tend toward large cell size and low stability. By "stability" is meant the tendency of a foam body to maintain its dimensions after extrusion. Extruded polystyrene foams oftentimes exhibit substantial benefits over other varieties of polystyrene foams such as the so-called bead foams; that is, foams prepared by the expansion of polystyrene particles which contain a blowing agent. The bead foams generally exhibit substantially higher water absorption and poorer physical properties, such as compression, tensile strength and the like. In extruded foams, depending upon the conditions of extrusion, maximum compressive strength may be obtained either in the direction of extrusion or in a direction transverse to the direction of extrusion; that is, in the machine and the two transverse directions (width and thickness). Such control is generally not possible with the bead foams. Small sections of low density polystyrene foams have been extruded. Such sections have exhibited limited dimensional stability. For example: a polystyrene foam extruded as a round rod having a dimension of 2 inches may exhibit a density approaching one pound per cubic foot an have a reasonable degree of dimensional stability. However, when a like formulation is extruded in the form of a plank or a pad or a 10 inch diameter foam billet, the material which appeared stable and of low density collapses and distorts after a relatively short period of time on exposure to air. For any particular foaming styrene polymer system and extrusion conditions a decrease in cell size by varying nucleator concentration or level is accompanied by an increase in the density of the resultant foam. For purposes of thermal insulation, it is highly desirable that a relatively small cell size be maintained as well as low density, as the insulation value of styrene polymer foams is dependent at least in part upon the cell size. Thus, a polystyrene foam, for example, having a density of 2.2 pounds per cubic foot and a large cell size is a poorer insulator than foam of a like density and smaller cell size. A highly desirable cell size for styrene polymer foams is from about 0.1 to 0.45 millimeter, which heretofore in extruded foams has been obtainable only in higher density foams. Low density, small cell size foams are desirable in that an increased amount of insulation is obtained per unit weight of polymer plus increased output in volume per unit weight of material.

It would be desirable if there were available a low density foam with small cell size which would provide insulation generally commensurate with a higher density foam. Thus, for a number of reasons, it would be highly desirable to obtain a styrene polymer foam having insulating values equivalent to normally available higher density foams.

It would also be desirable if there were available an improved low density dimensionally stable extruded styrene polymer foam.

It would further be desirable if there were available an improved method for the preparation of alkenyl aromatic thermoplastic synthetic resonous foams by an extrusion process.

It would also be desirable if there were available a means of determining when a styrene-type polymer gel containing a blowing agent was capable of forming a generally uniform foam.

These benefits and other advantages in accordance with the present invention are achieved in an alkenyl aromatic thermoplastic synthetic resinous elongate foam body having a machine direction and a transverse direction, the body being formed of a polymer of at least 50 weight percent of a monomer of the formula

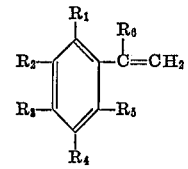

wherein $R_{1-5}$ are individually selected from hydrogen, chlorine, bromine and lower alkyl radicals containing up to 4 carbon atoms, $R_6$ is hydrogen or methyl, with the further limitation that the maximum number of carbon atoms is 12, and the remainder of the polymer being another ethylenically unsaturated monomer copolymerizable therewith, the body defining a plurality of closed non-interconnecting gas-containing cells therein, and beneficially the foam containing at least $1.35 \times 10^{-4}$ to $24.6 \times 10^{-4}$ moles per gram of dichlorodifluoromethane, trichlorofluoromethane or 1,2-dichlorotetrafluoroethane, or mixtures thereof, and advantageously from $3.9 \times 10^{-4}$ to $11.6 \times 10^{-4}$ moles per gram of polymer, the average cell size being from about 0.1 to 0.45 millimeter, the foam body having a density of from about 1.4 to about 1.8 pounds per cubic foot, the foam body being a generally uniform cellular structure and being without discontinuities and being without substantive variations in average cell size when cell size is measured by averaging cell diameters across the minimal cross-sectional dimension of the body (such as by ASTM Method D2842–69), the elongate body having a cross-sectional area of at least 18 square inches and having a minimum cross-sectional dimension of at least one half inch, the foam body having a water vapor permeability not greater than 1.8 perm inches as measured by ASTM Method C355–64, procedure for Dessicant Method, and the body being a continuous hardened thermoplastic gel.

Also contemplated within the scope of the present invention is a method for the extrusion of alkenyl aromatic thermoplastic synthetic resinous foam elongate bodies having a density of from about 1.4 to 1.8 pounds per cubic foot and having a cell size of from about 0.1 to 0.45 millimeter, the steps of the method comprising heat plastifying an alkenyl aromatic thermoplastic synthetic resinous material containing from about $15 \times 10^{-4}$ to $40 \times 10^{-4}$ moles per gram of polymer, and beneficially $18 \times 10^{-4}$ to $30 \times 10^{-4}$ moles per gram of polymer, of a volatile fluid foaming agent, generally uniformly admixing the foaming agent with the heat plastified resin, passing the blowing agent containing resin from an extrusion die into a region of lower pressure wherein the extruded resin expands to form a foam body having a cross-sectional area of at least 18 square inches and having a minimal cross-sectional dimension of at least one half inch, the improvement which comprises admixing the resin and blowing agent to a sufficient degree that on sampling in the hereinafter described manner the sampled resinous material has lost not more than $7.9 \times 10^{-4}$ moles of the volatile fluid foaming agent per gram of polymer.

By the term "alkenyl aromatic thermoplastic synthetic resin" is meant a solid polymer of one or more polymerizable alkenyl aromatic compounds. The polymer or copolymer comprises in chemically combined form, at least 50 percent by weight of at least one alkenyl aromatic compound having the general formula

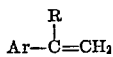

wherein Ar represents an aromatic hydrocarbon radical, or an aromatic halo-hydrocarbon radical of the benzene series, and R is hydrogen or the methyl radical. Examples of such alkenyl aromatic resins are the solid homopolymers of styrene, α-methylstyrene, o-methylstyrene, m-methylstyrene, p-methylstyrene, ar-ethylstyrene, ar-vinylxylene, ar-chlorostyrene or ar-bromostyrene; the solid copolymers of two or more of such alkenyl aromatic compounds with minor amounts of other readily polymerizable olefinic compounds such as methylmethacrylate, acrylonitrile, maleic anhydride, citraconic anhydride, itaconic anhydride, rubber reinforced (either natural or synthetic) styrene polymers, etc.

Volatile fluid foaming agents useful in accordance with the present invention are those foaming agents which are mixtures of from 25 to 75 weight percent, and beneficially from 40 to 60 weight percent, of a member selected from the group consisting of dichlorodifluoromethane, trichlorofluoromethane, dichlorotetrafluoroethane and mixtures thereof, and from 75 to 25 weight percent of a member selected from the group consisting of methyl chloride, vinyl chloride, ethyl chloride and mixtures thereof. Any isomer of dichlorotetrafluoromethane can be used with benefit. Generally the 1,2-dichlorotetrafluoroethane is employed.

It is essential and critical to the present invention that adequate dispersion of the blowing agent in the styrene-type polymers be obtained. Adequate mixing or dispersion for the practice of the present invention can readily be determined by sampling a stream of heat plastified gel coming from suitable dispersing or mixing apparatus (such as a jacketed extruder, agitated vessel or other mixing equipment suitable for mixing viscous gels) at the proposed processing temperature and pressure by employing a gel sampling apparatus which comprises a ½ inch outside diameter, 5/16 inch inside diameter stainless steel tube about nine inches in length inserted into a gel stream and having an end generally centered in the gel stream and normal to the direction of flow. The tube external to the gel stream is connected to a one half inch iron pipe size I.P.S. forged steel elbow; the elbow is connected to a ½ x 3 inch long Schedule 80 nipple, which in turn is connected to a one half inch gate valve (3000 p.s.i. O.W.G.), a second 3 inch Schedule 80 one half inch I.P.S. nipple and a one half inch I.P.S. forged steel elbow, a 2 x ½ inch Schedule 80 nipple, a one half inch I.P.S. coupling and a brass I.P.S. to copper adaptor. A 33 inch length of one half inch outside diameter copper tube having a 3/32 inch wall thickness is connected to the brass female fitting, the remaining end of the copper tubing engages a female tubing fitting which in turn is screwed into an adaptor having one half inch male pipe threads which in turn connects to a one half inch gate valve having a pressure rating of 3000 pounds per square inch O.W.G. The length of copper tube is jacketed by means of a jacket formed of one half inch Schedule 80 pipe 32.5 inches long which is surrounded by a length of 1.5 inch Schedule 80 pipe welded at the ends to form a steam jacket. The entire sampling line exclusive of the portion contained in the jacketed pipe is traced with ¼ inch copper tubing which in turn is connected to the one half inch copper pipe and to the valve remote from the gel sampling end. Thus, the sampling apparatus has an inlet valve adjacent the gel sampling end and a discharge valve affixed to the copper tubing remote from the inlet valve. Gel samples are taken in the following manner: steam at 150 pounds per square inch is applied to the ¼ inch copper tubing tracing the sample line. When the sampling apparatus is to be employed, a pre-heating period of one hour at 150 pounds of steam pressure is sufficient to raise the sampling apparatus to a suitable sampling temperature. The valves and the sampling line should be covered with asbestos or other suitable pipe insulation. Heat plastified gel is provided to the sampling apparatus by opening both valves for a period of about 20 minutes. The discharge valve is closed until the valve open area is about 50 percent of the full open area and within the range of 40 to 60 percent of the full open area and this opening flow is maintained at this position for a period of one hour. At the end of the one hour period, the discharge valve is closed. After one minute, the valve adjacent the gel sampling end is closed and steam removed from the tracer line and cold water applied to cool the sampling. When room temperature is reached, the one half inch copper tubing within the jacketed one half inch pipe is removed. Two diametrically opposed slots are milled the length of the copper tubing and the hardened gel sample removed therefrom marking the end of the sample which was nearest the gel source. At the end of the gel sample which was nearest the gel source, a one inch length is cut and discarded. A second one inch length is cut and weighed on an analytical balance to the nearest milligram. The sample is then placed in a vacuum oven maintained under a pressure of about one inch of mercury for a period of 30 minutes at a temperature of 155° C. After a period of 30 minutes, the sample is removed from the oven, cooled to room temperature and re-weighed. The loss in weight represents the loss of blowing agent and the loss of blowing agent is then calculated on the basis of moles per gram of polymer. The concentration of blowing agent in the original gel prior to sampling is known from the amount of polymer and blowing agent supplied to the heat plastifying and mixing device. The difference between the initial blowing agent concentration and the concentration obtained in the sample is readily determined by subtraction. If this value is equal to or less than $7.9 \times 10^{-4}$ moles per gram of polymer, the apparatus provides adequate mixing of the blowing agent with the molten polymeric material to prepare desirable foam.

Foam prepared in accordance with the present invention is particularly desirable in that stable non-distorting shapes are extruded. Such foams are useful for a wide variety of applications, including flotation, fabrication into various shaped articles such as fillets, packages, as well as a wide variety of decorative items. The stable foam of the present invention is particularly beneficial for the preparation of insulation board wherein the insulating boards are extruded and foamed to a predetermined size and have only minor dimensional deviation from the desired configuration. Advantageously, by chilling the surface of the foam as it is extruded, a high density skin may be obtained which is particularly suitable for insulation board which is subject to substantial handling during installation. In the practice of the present invention, foams are obtained which have a relatively small cell size when compared to conventionally extruded polystyrene foams. Desirably, the cell size of these foams is from about 0.1 to 0.45 millimeter, and beneficially from 0.2 to 0.4 millimeter. Such foams provide excellent insulating value and relatively low density stable products.

In the following examples, a plurality of foams are prepared under varying conditions, each employing the hereinbefore described sampling procedure. In each case, polymer is heat plastified in an extruder substantially in the manner of U.S. Pat. 2,669,751, and a volatile fluid blowing agent injected into the heat plastified polymer stream. From the extruder the heat plastified gel is passed into a mixer, the mixer being a rotary mixer wherein a studded rotor is enclosed within a housing which has a studded internal surface which intermeshes with the studs on the rotor. The heat plastified gel from the extruder is fed into end of the mixer and discharged from the remaining end, the flow being in a generally axial direction. From the mixer, the gel passes through coolers such as are described in U.S. Pat. 2,669,751 and from the coolers to a die which extrudes a generally rectangular board having the dimensions set forth in the tables which follow. After extrusion of an acceptable foam, density, cell size, compressive strength, water vapor permeability, and thermal conductivity are determined.

EXAMPLE 1

Polystyrene having a viscosity of 14 centipoises (measured as a 10 percent solution in toluene) is fed to the extruder at the rate of 541 parts by weight per hour. The blowing agent consists of a 1:1 by weight mixture of methyl chloride and dichlorodifluoromethane which is injected into the heat plastified polymer prior to its entry to the mixer. The intermeshing studs of the mixer have a relative velocity of 100 feet per minute. A total feed of $20.3 \times 10^{-4}$ moles of blowing agent per gram of polystyrene is employed. 0.06 part of indigo per 100 parts of polystyrene is added as a nucleator. A stable rectangular board is extruded at a temperature of 121.5° C. having a cross-sectional dimension of 2.25 x 24 inches, a density of 1.46 pounds per cubic foot and an average cell diameter of 0.37 millimeter. The foam has a thermal conductivity of 0.218 British thermal units-inch per square foot×hour per ° F. and a moisture vapor permeability of 1.58 perm inches. Analysis, by the previously described technique, of a sample of the gel prior to foaming yields $12.7 \times 10^{-4}$ moles of blowing agent per gram of polystyrene, a loss of $7.6 \times 10^{-4}$ moles of blowing agent per gram of polystyrene. The foam contains $6.0 \times 10^{-4}$ moles of dichlorodifluoromethane per gram of polymer. The foam has a compressive strength of 27.6 pounds per square inch as measured in a direction normal to a major face of the sheet at 0.1 inch deflection.

EXAMPLE 2

In a manner similar to that described in Example 1, a plurality of stable foams are produced. The conditions and properties are set forth in the following tables.

TABLE I

| Run | Polystyrene [1] | Die temperature, ° C. | Indigo [2] | Concentration of blowing agent | | Loss of blowing agent |
|---|---|---|---|---|---|---|
| | | | | In feed [3] | Found by analysis | |
| 1 | 541 | 120.5 | 0.06 | $19.7 \times 10^{-4}$* | $16.4 \times 10^{-4}$* | $3.3 \times 10^{-4}$* |
| 2 | 365 | 121 | 0.07 | $21.8 \times 10^{-4}$* | $17.9 \times 10^{-4}$* | $3.9 \times 10^{-4}$* |
| 3 | 355 | 120 | 0.07 | $18.9 \times 10^{-4}$* | $15.7 \times 10^{-4}$* | $3.2 \times 10^{-4}$* |
| 4 | 545 | 120.5 | 0.06 | $19.6 \times 10^{-4}$* | $15.5 \times 10^{-4}$* | $4.1 \times 10^{-4}$* |
| 5 | 541 | 120.7 | 0.04 | $20.1 \times 10^{-4}$* | $13.8 \times 10^{-4}$* | $6.3 \times 10^{-4}$* |
| 6 | 367 | 120 | 0.07 | $22.8 \times 10^{-4}$* | $18.1 \times 10^{-4}$* | $4.7 \times 10^{-4}$* |
| 7 | 545 | 120 | 0.06 | $20.2 \times 10^{-4}$* | $13.1 \times 10^{-4}$* | $7.1 \times 10^{-4}$* |

[1] Parts by weight per hour.
[2] Parts per hundred of polymer.
[3] 50:50 weight percent mixture of methyl chloride:dichlorodifluoromethane.
*Moles per gram.

TABLE II

| Run | Cross-sectional dimension of foam (inches) | Density [1] | Average cell diameter (millimeter) | Thermal conductivity [2] | Mositure vapor permeability [3] | Compressive strength [4] | Dichlorodifluoromethane [5] |
|---|---|---|---|---|---|---|---|
| 1 | 2.25 x 24 | 1.52 | 0.37 | 0.217 | | 33.2 | 5.8 |
| 2 | 1 x 24 | 1.77 | 0.40 | 0.203 | 1.03 | 38.3 | 6.4 |
| 3 | 1 x 24 | 1.77 | 0.42 | 0.200 | 1.06 | 32.1 | 5.6 |
| 4 | 2.25 x 24 | 1.52 | 0.37 | 0.217 | 1.46 | 34.5 | 5.8 |
| 5 | 2.25 x 24 | 1.50 | 0.37 | 0.217 | | 30.1 | 6.0 |
| 6 | 1 x 24 | 1.68 | 0.37 | 0.202 | | 33.5 | 6.7 |
| 7 | 2.25 x 24 | 1.55 | 0.34 | 0.212 | | 30.4 | 6.0 |

[1] Pounds per cubic foot.
[2] Samples aged 110 days at room temperature British thermal units, inch per square foot-hour, ° F.
[3] Perm inch.
[4] Pounds per square inch; measured normal to major face of sheet at 0.1 inch deflection.
[5] In foam; moles $\times 10^{-4}$ per gram of polymer.

For comparative purposes, the procedure of Example 1 is employed with the exception that in each case the relative velocity of the intermeshing studs on the mixer is zero. The foam samples obtained are too irregular to test and analysis of the gel before foaming reveals large losses of blowing agent.

TABLE III

| Run | Polystyrene [1] | Foaming temperature, ° C. | Indigo [2] | Concentration of blowing agent | | Loss of blowing agent |
|---|---|---|---|---|---|---|
| | | | | In feed [3] | Found by analysis | |
| 8 | 474 | 119 | 0.05 | $18 \times 10^{-4}$* | $9.7 \times 10^{-4}$* | $8.3 \times 10^{-4}$* |
| 9 | 506 | 118 | 0.10 | $19.5 \times 10^{-4}$* | $10.1 \times 10^{-4}$* | $9.4 \times 10^{-4}$* |

[1] Parts by weight per hour.
[2] Parts per hundred of polymer.
[3] 50:50 weight percent mixture of methyl chloride:dichlorodifluoromethane.
*Moles per gram.

In a manner similar to the foregoing examples, excellent low density, small cell size stable foams are prepared when mixtures of from about 25 to 75 weight percent dichlorodifluoromethane, trichlorofluoromethane or 1,2-dichlorotetrafluoroethane and mixtures thereof, and from about 75 to 25 weight percent methyl chloride, vinyl chloride or ethyl chloride or mixtures thereof are employed.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. An alkenyl aromatic thermoplastic synthetic resinous elongate foam body having a machine direction and a transverse direction, the body being prepared by extrusion, the body being formed of a polymer of at least 50 weight percent of a monomer of the formula

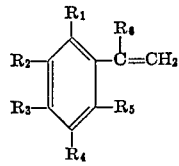

wherein $R_{1-5}$ are individually selected rom hydrogen, chlorine, bromine and lower alkyl radicals containing up to 4 carbon atoms, $R_6$ is hydrogen or methyl, with the further limitation that the maximum number of carbon atoms is 12, and the remainder of the polymer being another ethylenically unsaturated monomer copolymerizable therewith, the body defining a plurality of closed non-interconnecting gas-containing cells therein, the foam containing from about $1.35 \times 10^{-4}$ to $24.6 \times 10^{-4}$ moles of a member selected from the group consisting of dichlorodifluoromethane, trichlorofluoromethane and 1,2-dichlorotetrafluoromethane, and mixtures thereof, per gram of polymer, the average cell size being from about 0.1 to 0.45 millimeter, the foam body having a density of from about 1.4 to 1.8 pounds per cubic foot, the foam body being a generally uniform cellular structure without discontinuities and without substantial variation in average cell size when cell size is measured by averaging cell diameters across the minimal cross-sectional dimension of the body, the elongate body having a cross-sectional area of at least 18 square inches and having a minimal cross-sectional dimension of at least one half inch, the foam body having a water vapor transmission rate not greater than 1.8 perm inches, and the body being a continuous hardened thermoplastic gel.

2. The body of claim 1 wherein the foam contains at least $3.9 \times 10^{-4}$ to $11.6 \times 10^{-4}$ moles of dichlorodifluoromethane per gram of polymer.

3. The body of claim 1 wherein the alkenyl aromatic monomer is styrene.

4. The body of claim 1 wherein the gas within the cells comprises a mixture of dichlorodifluoromethane and methyl chloride.

5. A method for the extrusion of an alkenyl aromatic thermoplastic synthetic resinous foam elongate body, the steps of the method comprising
heat plastifying an alkenyl aromatic thermoplastic synthetic resinous material containing from about $15 \times 10^{-4}$ to $40 \times 10^{-4}$ moles per gram of polymer of a foaming agent, the foaming agent being from about 25 to 75 weight percent of a member selected from the group consisting of dichlorodifluoromethane, trichlorofluoromethane, dichlorotetrafluoroethane and mixtures thereof, and from about 75 to 25 weight percent of a member selected from the group consisting of methyl chloride, ethyl chloride and vinyl chloride and mixtures thereof, and
generally uniformly admixing the foaming agent with the heat plastified resin,
passing the blowing agent-containing resin from an extrusion die into a region of lower pressure wherein the extruded resin expands to form a foam body having a cross-sectional area of at least 18 square inches and having a minimal cross-sectional dimension of at least one half inch, the foam body having a density of from about 1.4 to 1.8 pounds per cubic foot and having a cell size from about 0.1 to 0.45 millimeter, including
admixing the resin and blowing agent to a sufficient degree that on sampling the mixture of foaming agent and heat plastified resin prior to extrusion, the sampled material has lost not more than $7.9 \times 10^{-4}$ moles of the foaming agent per gram of polymer.

6. The method of claim 5 wherein the volatile fluid foaming agent is present in a quantity of from $18 \times 10^{-4}$ to $30 \times 10^{-4}$ moles per gram of polymer.

7. The method of claim 5 wherein the alkenyl aromatic resinous material is polystyrene.

8. A polystyrene elongate foam body having a machine direction and a transverse direction, the body being prepared by extrusion and being formed of polystyrene, the body defining a plurality of closed, non-interconnected gas-containing cells therein, the foam containing from about $3.9 \times 10^{-4}$ to $11.6 \times 10^{-4}$ moles of dichlorodifluoromethane per gram of polymer, the average cell size being from about 0.1 to 0.45 millimeter, the foam body having a density of from about 1.4 to 1.8 pounds per cubic foot, the foam body being a generally uniform cellular structure without discontinuities and without substantial variation in average cell size when cell size is measured by averaging cell diameters across the minimal cross-sectional dimension of the body, the elongate body having a cross-sectional area of at least 18 square inches and having a minimal cross-sectional dimension of at least one half inch, the foam body having a water vapor transmission rate not greater than 1.8 perm inches and the body being a continuous hardened thermoplastic gel.

9. A method for the extrusion of a polystyrene synthetic resinous foam elongate body, the steps of the method comprising
heat plastifying polystyrene containing from about $15 \times 10^{-4}$ to $40 \times 10^{-4}$ moles per gram of polymer of a foaming agent, the foaming agent being about 25 to 75 weight percent dichlorodifluoromethane and from about 75 to 25 weight percent methyl chloride,
generally uniformly admixing the foaming agent with the heat plastified polystyrene,
passing the blowing agent-containing resin from an extrusion die into a region of lower pressure wherein the resin expands to form a foam body having a cross-sectional area of at least 18 square inches and having a minimal cross-sectional dimension of at least one half inch, the body having a density of from about 1.4 to 1.8 pounds per cubic foot and having a cell size from about 0.1 to 0.45 millimeter, the resin and blowing agent being admixed to a sufficient degree that on sampling the mixture of foaming agent and resin prior to extrusion the sampled material has lost not more than $7.9 \times 10^{-4}$ moles of foaming agent per gram of polymer.

References Cited
UNITED STATES PATENTS
3,188,295　6/1965　Ballast et al. _____ 260—2.5 E

FOREIGN PATENTS
730,745　3/1966　Canada _____ 260—2.5 E

WILBERT J. BRIGGS, Sr., Primary Examiner

U.S. Cl. X.R.

260—2.5 HB, 33.8 UA, 88.1 P, 93.5 A; 264—53, 177, 204, 205